April 3, 1962 E. R. WALKER 3,028,112

DEVICE FOR MAKING NOVELTIES FROM SERPENTINE TAPE OR THE LIKE

Filed Sept. 6, 1960 2 Sheets-Sheet 1

INVENTOR.
ERNEST R. WALKER
BY
Hansen and Lane
HIS ATTORNEYS

April 3, 1962 E. R. WALKER 3,028,112

DEVICE FOR MAKING NOVELTIES FROM SERPENTINE TAPE OR THE LIKE

Filed Sept. 6, 1960 2 Sheets-Sheet 2

INVENTOR.
ERNEST R. WALKER
BY
Hansen and Lane
HIS ATTORNEYS

United States Patent Office 3,028,112
Patented Apr. 3, 1962

3,028,112

DEVICE FOR MAKING NOVELTIES FROM SERPENTINE TAPE OR THE LIKE

Ernest R. Walker, 1433 St. Francis Drive, San Jose, Calif., assignor of one-half to Phillip J. Walker, Capitola, Calif.

Filed Sept. 6, 1960, Ser. No. 54,250
5 Claims. (Cl. 242—55.54)

This invention relates to tape winders and more particularly to a novel apparatus facilitating the winding of serpentine tape and the removal of the wound tape therefrom for the purpose of creating novelties therefrom.

One object of this invention is to provide a simple yet effective means for winding a ribbon or tape for ready removal and subsequent formation and treatment.

Another object is to provide a novel arrangement for feeding and winding tape and/or ribbon into a flat roll and for stripping such roll of tape from the device in a facile manner.

These and other objects and advantages of the present invention will become apparent from a reading of the following description in the light of the accompanying drawings in which.

Figure 1:
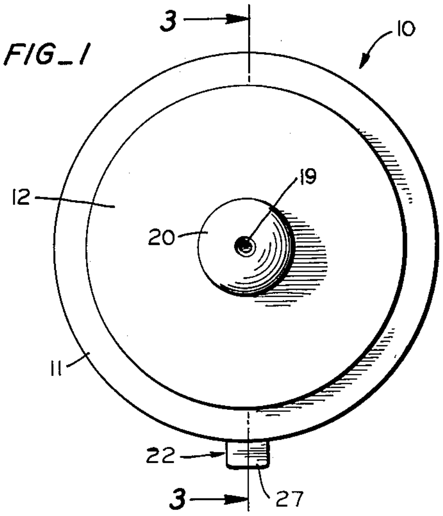
FIG. 1 is a top plan view of my new tape winder.
Figure 2:
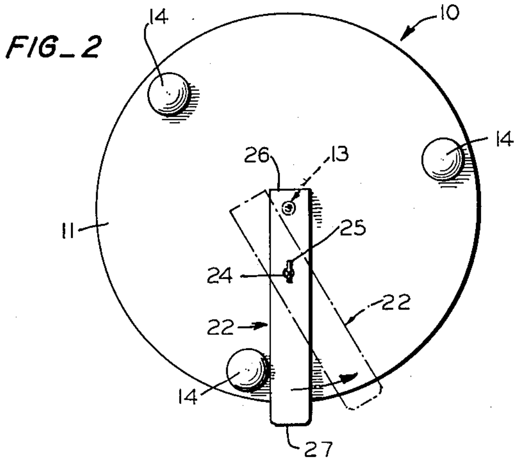
FIG. 2 is a bottom plan view of the same.
Figure 3:
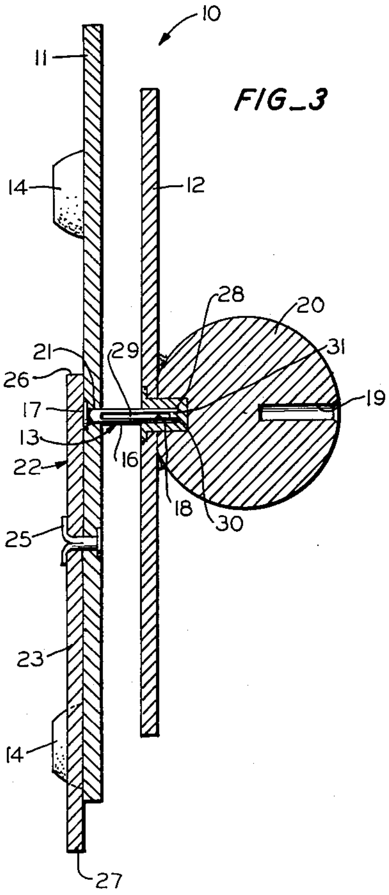
FIG. 3 is a section through FIG. 1 taken along line 3—3 thereof and at double scale relative thereto.
Figures 6, 7, 8:
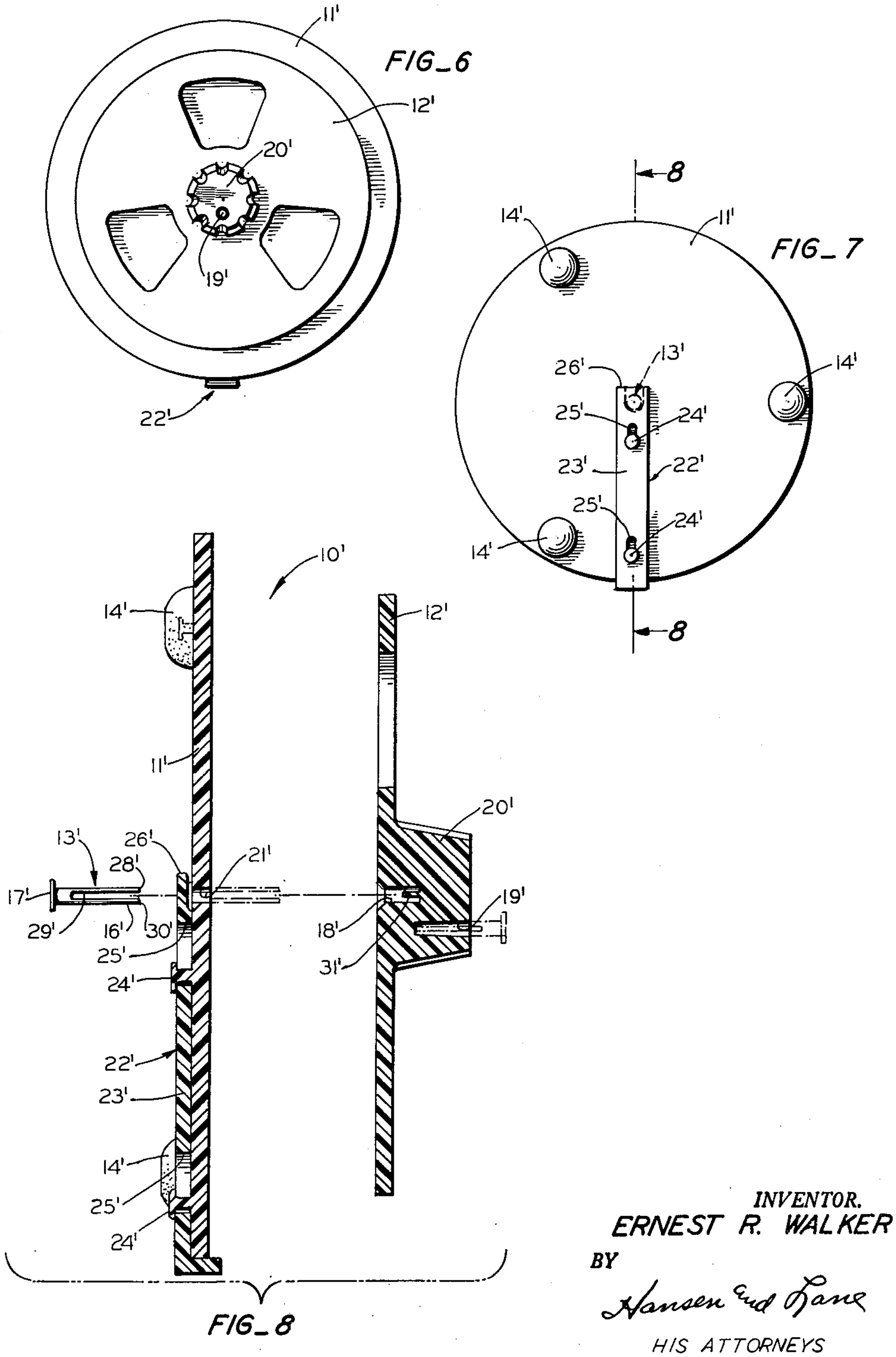
FIG. 6 is a top plan view of a modified form of tape winder.
FIG. 7 is a bottom plan view of FIG. 6.
FIG. 8 is an enlarged section through FIG. 7 taken substantially along line 8—8 thereof with parts disassembled.

Referring to the drawings the device as shown in FIGS. 1 to 3 inclusive will be described and like reference numerals applied to the device as shown in FIGS. 6 through 8 will indicate like parts but will be distinguished from those in the preferred embodiment by the use of prime exponents.

The device, generally designated 10 comprises a flat base plate 11 joined to a cover plate 12 by a spindle 13, the base 11 having feet 14 on its underside for supporting the base plate 11 in parallel spaced relation to a horizontal surface such as a table, bench or other surface.

The spindle 13 consists of a split pin 16 having a flat head 17, the pin being of a fixed or predetermined length so as to fit into a socket 18 formed at the center of the cover plate 12.

Referring more particularly to FIG. 8 it will be noted that the base plate 11' and cover plate 12' are adapted to be separated from each other upon removal of the spindle 13'. Normally, that is when the device 10 or 10' is not in use, the spindle 13 or 13' is stored by being press fit into a tapered bore 19 formed in a knob 20 and/or 20' which is either formed integrally with the cover plate 12' as in FIGS. 6 and 8 or secured to the cover plate 12 as in FIGS. 1 and 3.

In either case the knob 20—20' is concentric of the socket 18—18' which receives the spindle 13—13' to facilitate manual rotation of the plate 12 or 12' about the axis of the spindle which extends laterally from the base plate (11 as indicated in FIG. 3).

As previously mentioned the spindle 13 has a flat head 17. This flat head 17 abuts the lower surface of the base plate 11 and serves with the bore 21 in the plate 11 to stabilize the spindle 13 and to hold the latter in axial disposition relative to the plate 11. Means 22 is provided on the bottom surface of the plate 11 to maintain the spindle 13 in fixed position relative to the plate 11, i.e., so the spindle will not drop out of the bore 21 when the base plate is horizontally disposed and supported on the feet 14 as previously explained.

There are two forms of the pin maintaining means shown, one 22 in FIGS. 1, 2 and 3 and the other 22' in FIGS. 6 through 8. In FIGS. 2 and 3 the means 22 consists of a lever 23 pivotally mounted as at 24 on a pin 25 secured to the base plate 11 radially of the axis of the spindle 13. The lever 23 has its inner end 26 disposed to rock into and out of alignment with the axial bore 21 in plate 11 so as to overlay the head 17 of the spindle 13 for maintaining the latter in fixed position in the bore 21 in the manner and for the purpose previously explained. The opposite end 27 of the lever 23 extends beyond an edge of the base plate 11 to provide a handle whereby to manipulate the lever 23 into and out of spindle maintaining position.

In FIGS. 7 and 8 the means 22' consists of a slide bar 23' having dual pin and slot connection 24'—25' with the underside of the base plate 11'. The slide bar 23' is arranged radially of the base plate 11' so as to slide inwardly and outwardly relative to the axial bore 21' in the base plate 11'. The inner end 26' of the slide bar 23' is disposed to move into and out of register with the bore 21 so as to overlay the head 17' of the pin 16' when the bar 23' is moved to its inward limit and to be withdrawn from overlaying position relative to the spindle 13' when the bar 23' is disposed at its outward limit of movement on the pin and slot connection 24'—25' relative to the plate 11'.

In the event of the use of either means 22 or 22' the bifurcated end 28—28' of the split pin 16 or 16' projects beyond the upper surface of the base plate 11 or 11' as the case may be. This provides a slot 29—29' into which one end of a ribbon or strip of tape T may be inserted to facilitate winding thereof upon the spindle 13—13'. It should here be noted that the tape or ribbon T is narrower in width than the bifurcated end 28—28' is long and as a result about one half of the latter extends beyond the edge of the tape mounted thereon.

After the tape T is threaded upon the spindle as aforesaid, the cover plate 12—12' is mounted on the remaining portion 30—30' of the bifurcated end of the split pin 16—16'. That is to say, the portion 30—30' fits into the socket 18—18' provided on the cover plate 12 or 12' respectively.

As another feature of the present invention there are certain characteristics about the socket 18 or 18' which have a bearing on the function and operation of the instant device. In this connection note that the socket 18 or 18' is of a limited depth so as to receive only that portion 30 or 30' of the split pin which extends beyond the edge of the tape T. In other words when the split pin 16 or 16' is fully seated in its respective socket 18 or 18' the cover plate 12 or 12' as the case may be will be spaced from the base plate 11 or 11' such as to leave sufficient space between them to receive the tape T plus enough clearance so as not to bind the edges of the tape.

In further connection with the socket and split pin of the present invention it will be noted that the base of the socket is provided with a key 31 or 31' which is a diametric rib dimensioned to fit into the slot provided at the end of the bifurcated pin 16—16'. In this manner the cover plate 12—12' is operatively connected to the spindle 13—13' such that upon turning of the knob, 20 or 20' as the case may be, the spindle will turn to cause the tape T threaded into the slot 29—29' to be wound about the spindle while being maintained between the spaced base and cover plates 11—11' and 12—12' respectively.

A person using the device 10—10' manipulates the knob

20—20′ with one hand while holding with his other hand the tape going into the winder so as to tension the tape for nice tight winding upon the spindle. Should the tape break or additional tape be required more tape can be spliced onto the end of the length thereof on the winder. In this manner the ribbon or tape T will be built up into a flat disc-like roll as illustrated in FIG. 4.

When the roll is developed to the desired diameter the free end F of the tape may be secured to the last convolute by any well known mucilage or adhesive. This will keep the roll confined within the last convolute. Now then when the cover plate 12 or 12′ is withdrawn from the spindle 13—13′ and the lever 23—23′ moved to spindle freeing position, the spindle 13—13′ can be removed from the bore 21—21′ and the bifurcated end 28—28′ of the spindle thereby stripped from the inner end of the tape.

Figure 4:
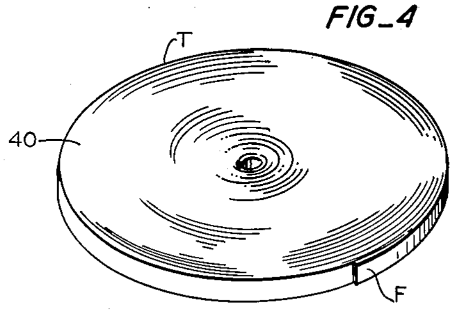
FIG. 4 is a perspective view of a roll of tape coiled on the device of FIGS. 1, 2 and 3.

The roll of tape thus formed appears as shown at 40 in FIG. 4. At this stage the roll 40 can be starched, dipped, sprayed or otherwise treated so as to remain solid and flat to serve as a hot pad for hot dishes or the like.

Figure 5:
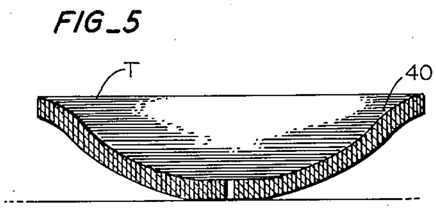
FIG. 5 is a section through a coil of tape such as the one of FIG. 4 molded into rish form.

Since the several inner convolutes of the tape T are not joined the flat roll 40 may be shaped into the form of a dish as illustrated in FIG. 5. There are many and various forms possible with the roll 40 as desired. Once the desired shape has been achieved, as in FIG. 4, the same may be treated with a stiffener, lacquer or any other known media of fixation so that the ultimate product will become a stiff unreshapeable article having utility and/or ornamental value.

While I have described the tape winder herein in specific detail it will be appreciated that the same is susceptible to variations, alterations and/or modifications without departing from the spirit of my invention. I therefore desire to avail myself of all variations, alterations and/or modifications as fairly come within the purview of the appended claims.

What I claim as new and desire to protect by Letters Patent is:

1. A tape winder comprising a flat base plate having feet on its underside for supporting said base in spaced parallel relation above a horizontal surface and having an axial bore, a spindle extending upwardly through said bore for rotation relative to said base, means on the underside of said base for maintaining said spindle in rotative relation to said base and with one end of said spindle projected upwardly therefrom, a cover plate removably secured to the projected end of said spindle and solely supported thereby in spaced relation to said base, means on said spindle for securing one end of a length of tape thereto, and means on said cover plate for turning the latter and said spindle for winding tape about the latter between said cover plate and base.

2. A tape winder comprising a flat base plate having an axial bore recessed to receive the head of a beaded split pin, a beaded split pin removably mounted in the bore in said base with the head of said pin within the recess of said bore, means on said base movable into and out of register with said axial bore to overlie the head of said pin for maintaining said split pin mounted on said base, a cover plate having an axial socket of limited depth and size to frictionally receive a portion of the projected end of said split pin to thereby support said cover solely on said pin and maintain said cover in spaced relation to said base and to facilitate threading of one end of a length of tape into the split pin exposed therebetween, and means on said cover plate facilitating manual turning thereof and turning said split pin for winding said tape upon said split pin between said base and cover.

3. A tape winder comprising a flat base plate having feet on its underside for supporting said base in spaced parallel relation above a horizontal surface and having an axial bore, a removable split pin extending upwardly through the bore in said base and having a flat head engageable with the underside of said base, means on the underside of said base movable into and out of register with the flat head of said pin for maintaining said split pin mounted on said base with one end of said pin projecting upwardly from said base, a cover plate having an axial socket of a depth and size to frictionally receive the projected end of said split pin whereby said cover plate is solely supported on said split pin in spaced relation to said base to facilitate threading of one end of a tape into the split pin exposed therebetween, a rib formed in said socket for keyed connection to said split pin for turning the latter with said cover, and means on said cover plate facilitating manual turning the latter and said spindle for winding said tape upon said split pin between said base and cover.

4. A tape winder comprising a flat base plate having an axial bore, a split pin slidingly fit into and mounted in the bore in said base for rotation relative to said base plate with one end of said split pin projected therefrom, a cover plate adapted to be solely mounted on said split pin and having an axial socket of a limited depth and size to frictionally receive a portion of the projected end of said split pin for solely supporting said cover in spaced relation to said base a distance to accommodate the width of a tape having one end threaded into that portion of the split pin exposed between said base plate and said cover plate, means on said cover plate facilitating manual turning of the cover plate and the split pin secured thereto for winding said tape upon said split pin between said base and cover plate, and means on said base movable into and out of register with said axial bore therein for maintaining said split pin in rotative relation thereto during winding of tape thereon into a roll of tape and for facilitating withdrawal of said split pin completely from said cover plate, roll of tape and base.

5. A tape winder comprising a flat base plate having an axial bore, a split pin slidingly fit into and mounted in the bore in said base for rotation relative to said base plate with one end of said split pin projected therefrom, a cover plate having an axial socket of a limited depth to receive and have press fit with portion of the projected end of said split pin for solely supporting said cover on said pin solely and in spaced relation to said base a distance to accommodate the width of a tape having one end threaded into that portion of the split pin exposed between said base and cover plate, a rib formed in said socket for keyed connection to said split pin for turning the latter with said cover, means on said cover plate facilitating manual turning thereof for winding said tape upon said split pin between said base and cover, and means on said base movable into and out of register with said axial bore therein for maintaining said split pin in rotative relation thereto during winding of tape thereon into a roll of tape and for facilitating withdrawal of said split pin completely from said cover plate, roll of tape and base.

References Cited in the file of this patent

UNITED STATES PATENTS

| | | |
|---|---|---|
| 1,464,349 | Burg et al. | Aug. 7, 1923 |
| 1,512,188 | Anderson | Oct. 21, 1924 |
| 2,464,832 | Stuart | Mar. 22, 1949 |
| 2,541,876 | Lockwood | Feb. 13, 1951 |
| 2,925,228 | Hayner et al. | Feb. 16, 1960 |